United States Patent [19]  [11] 4,028,516
Hirashima et al.  [45] June 7, 1977

[54] ACCELERATION DETECTOR SWITCH HAVING MAGNETIC BIASED CONDUCTIVE OSCILLATING CONTROLLER

[75] Inventors: Kenzo Hirashima; Harutoshi Tsujimura, both of Yokohama; Akira Hasegawa, Katsuta; Takahiko Tanigami, Mito; Kenichi Ushiku, Katsuta, all of Japan

[73] Assignees: Hitachi, Ltd.; Nissan Motor Co., Ltd., both of Japan

[22] Filed: Jan. 8, 1975

[21] Appl. No.: 539,425

[30] Foreign Application Priority Data
Jan. 14, 1974  Japan ............................ 49-6574

[52] U.S. Cl. .................... 200/61.45 M; 200/61.48; 200/61.49; 200/61.51
[51] Int. Cl.² ........................................ H01H 35/14
[58] Field of Search ........... 200/61.45 R, 61.45 M, 200/61.48–61.53, 159 A, 244–246, 249–251; 180/91, 105; 280/150 AB

[56] References Cited
UNITED STATES PATENTS

| 2,626,334 | 1/1953 | Koenig | 200/250 X |
| 3,188,435 | 6/1965 | Rugsten | 200/246 |
| 3,222,468 | 12/1965 | Nanninga | 200/159 A X |
| 3,238,334 | 3/1966 | Lopasic et al. | 200/159 A X |
| 3,778,572 | 12/1973 | Matsui et al. | 200/61.45 M |
| 3,944,764 | 3/1976 | Hirashima et al. | 200/61.45 M |

Primary Examiner—James R. Scott
Attorney, Agent, or Firm—Craig & Antonelli

[57] ABSTRACT

An acceleration detector using a combination of a bar magnet, an inertial substance or body and a fixed contact, in which the inertial substance is secured to the free end of a plate-spring supported in a cantilever fashion and having a pair of opposing curved portions.

15 Claims, 11 Drawing Figures

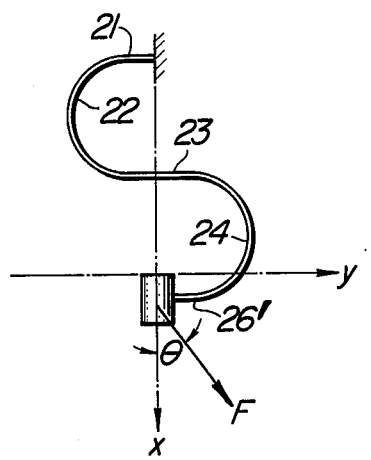
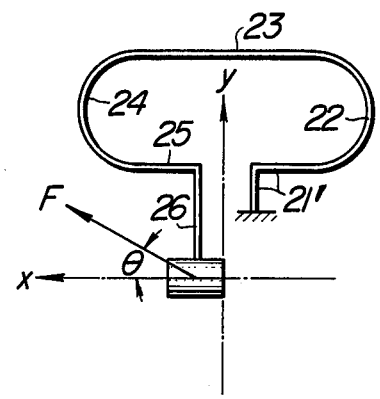
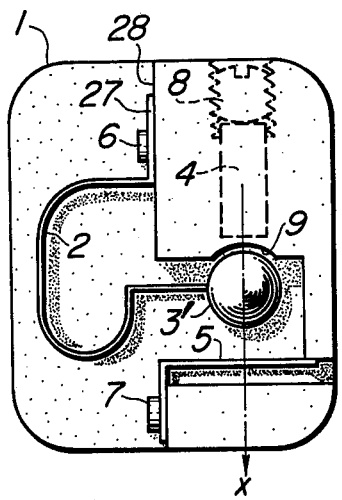
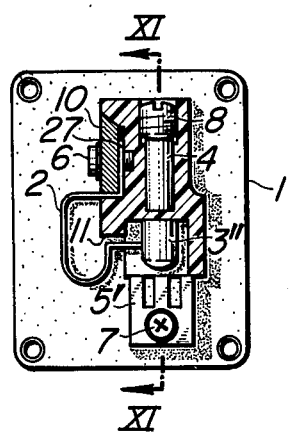
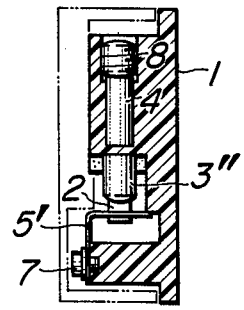

ACCELERATION DETECTOR SWITCH HAVING MAGNETIC BIASED CONDUCTIVE OSCILLATING CONTROLLER

BACKGROUND OF THE INVENTION

1. Field of the Invention

This invention relates to an acceleration detector, and more particularly to a detector for detecting impact and for use in an air bag system in a motor vehicle.

2. Description of the Prior Art

Hitherto, many attempts have been proposed for an acceleration detector or an impact detecting device. However, in case such a detector is used in an air bag system of a motor vehicle, there has been achieved only a partial success, because of lack of desired compactness in size, cost and reliability. More particularly, one of the requirements for an acceleration detector for use in an air bag system of motor vehicle is such that an impact force resulting from collision of a vehicle with other substance in the forward slantwise direction thereof, i.e., the detection characteristics of the acceleration, be constant within a range of declinations or declined angles covering 0° 45°. However, there has been proposed no attempt which has met such a requirement and presents an acceleration detector of a compact size and less in cost and high in reliability.

SUMMARY OF THE INVENTION

It is accordingly a principal object of the present invention to provide an acceleration detector adapted for use with an air system of a motor vehicle, which presents substantially constant acceleration detecting characteristics for horizontal declinations of acceleration, and yet provides a compact size, less cost and high reliability.

According to the present invention, there is provided an acceleration detector which includes a plate-spring having one end secured to a base mount and the other end free, the aforesaid plate-spring having at least a pair of curved portions in part of the length of the spring-plate, the free end of the plate spring having an inertial substance or body secured thereto, while the free end and the inertial substance are movable, with a suitable gap maintained from the base support, the inertial substance being of such a construction adapted to be attracted by a bar type magnet normally, and the widthwise direction of the plate-spring being maintained at a right angle to the horizontal plane.

BRIEF DESCRIPTION OF THE DRAWINGS

FIGS. 7 and 8 are cross-sectional views of still another embodiments of the plate-spring;

FIG. 9 is a cross-sectional plan view of part of a further embodiment of the present invention;

FIG. 10 is a view showing another embodiment of the invention; and

FIG. 11 is a cross-sectional view taken along the line XI—XI of FIG. 10.

DESCRIPTION OF THE PREFERRED EMBODIMENTS

Figure 1:
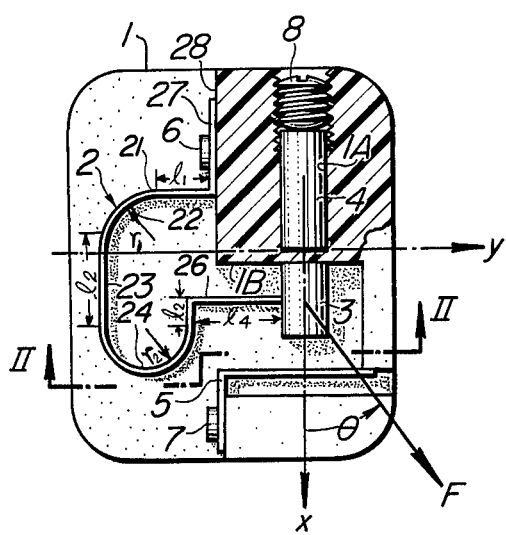
FIG. 1 is a cross-sectional plan view showing part of one embodiment of the acceleration detector according to the present invention.
Figure 2:
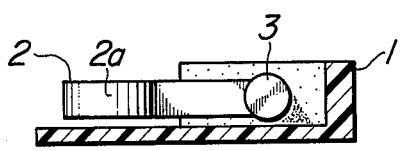
FIG. 2 is a vertical cross-sectional view taken along the line II—II of FIG. 1.

Reffering to FIGS. 1 and 2, shown at 1 is a base mount made of non-magnetic and electrically insulating material. Shown at 2 is a plate-spring whose one end is secured to the base mount 1 by means of a plate-spring attaching pin 6 and whose other end is free. Shown at 3 is an inertial substance or body which is secured to the free end of the plate-spring 3 and made of a magnetic material. Shown at 4 is a bar magnet which is attached in a hole 1A in the base mount 1 by means of a bar magnet fixing thread 8, with a fixed contact 5 being secured to the base mount 1 by means of a fixed-contact attaching pin 7 on the side opposing to the bar magnet 4. A X-axis corresponds to the longitudinal axis of a vehicle and is in alignment with a longitudinal axis of the bar magnet 4. A Y-axis corresponds to the transverse axis of a vehicle and runs at a right angle to the X-axis in the horizontal plane. Designated F is an accelerating force and $\theta$ a horizontal declination (angle) formed by the X-axis and the accelerating force. The elastic portion of the plate spring 2 and the inertial body 3 maintain suitable spacings from the base mount 1 and removable between the bar magnet 4 and the fixed contact 5. Normally, the inertial body is attracted to the bar magnet 4 to contact a vertical wall surface 1B of the base mount 1, being kept apart from the fixed contact 5. Since the plate spring 2 is attached to the horizontal surface of the base mount 1, while its widthwise direction 2a is held at a right angle to the horizontal plane of the base mount 1, the plate-spring 2 is reluctantly actuated due to impact in the vertical direction. This prevents mal-functioning of the acceleration detecting device due to the vertical vibration and thus presents high reliability, with the aid of the fact that the inertial body 3 is attracted to the bar magnet 4.

Figure 3:
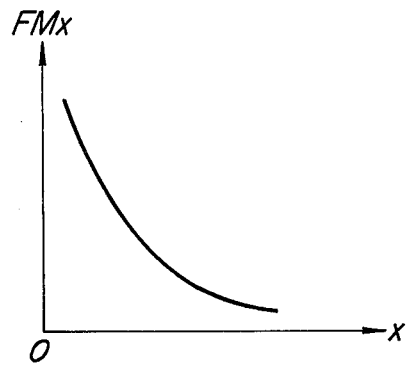
FIGS. 3 and 4 are plots showing the attracting-force characteristics of a bar type magnet as used in the acceleration detector according to the present invention.

When an acceleration force F acts on the detecting device, then the inertial body 3 is biased to the side of the fixed contact 5, being released from the attracting force of the bar magnet 4 to contact the fixed contact 5, thereby closing an electric circuit (not shown) which is connected to the plate-spring 2 and the fixed contact 5. Thus, there may be achieved impact detection of a vehicle. The aforesaid electric circuit is connected to the respective fixing portions of the plate-spring 2 and the fixed contact 5. The minimum accelerating force operable depends on a force of the bar magnet 4 attracting the inertial body 3. The magnitude of an attracting force of the bar magnet 4 varies with a distance between the bar magnet 4 and the inertial body 3 in the longitudinal axis, presenting characteristics as shown in FIG. 3. Stated differently, assume a distance $x$ between the bar magnet 4 and the inertial body 3 in the longitudinal axis, presenting characteristics as shown in FIG. 3. Stated differently, assume a distance $x$ between the bar magnet 4 and the inertial body 3, and an attracting force component $FM_x$ in the $x$ axis direction, then $FM_x$ decreases with an increase in $x$, as shown in FIG. 3. Accordingly, when the inertial body 3 is spaced a minute distance from the bar magnet 4 due to the accelerating force F acting thereon, then the attacting force of the bar magnet 4 will steeply decrease, thus insuring the positive operation of the device.

Figure 4:
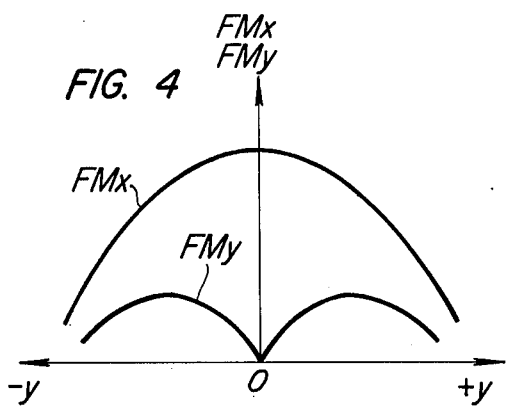

As shown in FIG. 1, in case the accelerating force F acts in the horizontal direction, the $x$ component of the accelerating force F is given as F $x$ cos $\theta$. On the other hand, in case F $x$ cos $\theta$ < FM$x$ on $x$ axis, the device is not operated, while the $y$ component of the force F (F $x$ sin $\theta$) acts on the inertial body 3, and on the other hand the inertial body is attracted in the $y$ direction. When the inertial body 3 moves in the $y$ direction, then the magnitude of an attracting force of the bar magnet 4 varies. FIG. 4 shows the relationship among the distance of $y$ measured from the longitudinal axis of the bar magnet 4 in the transverse direction, the $x$ component FM$x$ and the $y$ component FM$y$ of the attracting force. As the $y$ component increases, FM$x$ decreases, while FM$y$ increases with an increase in $y$. Then, when $y$ further increases, then FM$y$ decreases. The movement of the inertial body 3 in the $y$ direction continues, until F $x$ sin $\theta$ and FM$y$ are brought into equilibrium with a spring force of the plate-spring in the $y$ direction. When FM$x$ decreases due to the aforesaid movement down to F $x$ $\theta$ > FM$x$, then the inertial body 3 is released from an attracting force of the bar magnet 4 and hence actuated. As a result, the selection of the attracting force F, FM$x$, FM$y$ and a spring force of the plate-spring 2 to suitable values may maintain the accelerating force F constant within a range of 0° ± 45°.

Figure 5:
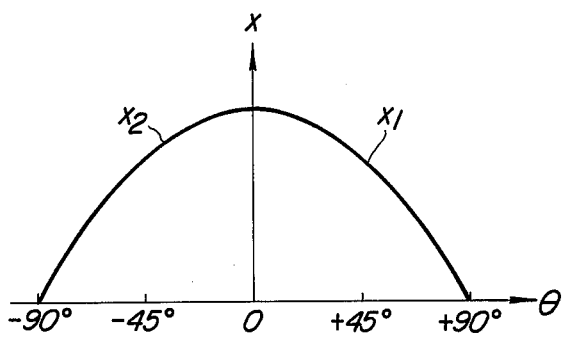
FIGS. 5 and 6 are plots showing characteristics of a plate-spring.
Figure 6:
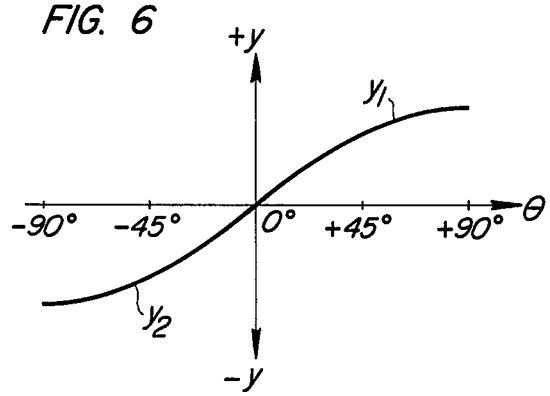

Meanwhile, it is imperative that a spring force of the plate-spring 2 be of a symmetrical nature with respect to the positive and negative values of $\theta$ under a given load $f$. In other words, in case a given load $f$ is exerted on the plate-spring 2 to the right (the horizontal declination $\theta$ with respect to the $x$ axis is positive), assume the displacements of the free end of the plate-spring 2 in the $x$ and $y$ axis directions as $x1$ and $y1$ (components). On the other hand, assume the displacements as $x2$ and $y2$, when the given load $f$ is appled to the left (the declination $\theta$ is negative). Then, it is imperative that $x1$ be equal to $x2$ and $y1$ be equal to $y2$ in their magnitudes but opposite to each other in their direction with respect to the $x$ axis. A cantilever plate spring having such characteristics is given as an example in FIG. 1 which indicates the plate spring 2 therein. In other words, as shown in FIG. 1, the plate spring is of such a cross-sectional construction consisting of a first linear portion 21 which extends over a given distance, $e$ a first curved portion 22 continuous with the end of the first linear portion and following a quarter circle having a suitable radius of curvature, $r$ a second linear portion 23 continuous with the end of the first curved portion and extending at a right angle to the first linear portion, while having a suitable length, $l2$ a second curved portion 24 which faces the first curved portion and follows a half circle having a suitable radius of curvature, $r2$ a third linear portion 25 extending in parallel with the second linear portion and extending in the opposite direction to that of the second linear portion, while having a suitable length, $l3$ and a fourth linear portion 26 of a length $l4$ continuous with the end of the third linear portion and extending in the direction at a right angle to the second linear portion but in parallel with the first linear portion. The spring plate also includes at its fixed end an extension 27 along the fixed end surface 28 of the base mount 1. Assume the lengths of the first, second, third and fourth linear portions of the plate spring 2 as $l_1$, $l_2$, $l_3$ and $l_4$, and assume the radii of the first and second curved portions as $r1$ and $r2$. Then, by determining the factors $l_1$, $l_2$, $l_3$, $l_4$, $r1$, $r2$ to suitable values, the displacements $x1$, $x2$, $y1$ and $y2$ of the free end of the plate spring 2, when a given load $f$ is applied at a horizontal declination $\theta$, are given as shown in FIGS. 5 and 6. The characteristics of displacements are of a symmetrical nature, as is clear from the fact that, when a force having a positive direction in $y$ direction (to the right as viewed in FIG. 1) is applied, the radius $r1$ decreases, while $r2$ increases. Conversely, when a force having a negative direction in the $y$ direction (to the left in FIG. 1) is applied, then the radius $r1$ increases and $r2$ decreases, presenting a symmetrical nature.

The plate spring 2 may be secured at its extension 27 to the base mount 1 through the medium of a holding member 10 with a length corresponding to the extension 27, as shown in FIG. 10.

A plate spring was made to the dimensions below by using a beryllium copper plate having a good spring or elastic characteristic and electric conductivity. Then, a given acceleration 20g was obtained within a range of horizontal declinations $\theta = 0° ± 45°$.

Case 1:
Thickness of plate $t = 0.1$, Width B = 3.7
$l_1 = 5$, $l_2 = 4$, $l_3 = 1$, $l_4 = 7$
$r_1 = 3$, $r_2 = 5$ (in mm)
Weight of inertial body 3 = 0.82 g Case 2:
$t = 0.08$, B = 8.0, W = 0.80g
$l_1 = 5$, $l_2 = 6$, $l_3 = 2$, $l_4 = 11$
$r_1 = 5$, $r_2 = 4$ Meanwhile, the length $l_1$ of the first linear portion is defined as the length of the portion thereof projecting from the end surface of the holding member 10, as shown in FIG. 7.

The plate-springs having characteristics as shown in FIGS. 5 and 6 may be replaced by the plate-springs having cross sectional constructions as shown in FIGS. 7 and 8. In FIG. 7, when force is applied in the $y$ direction (in the positive direction), then the radius $r1$ of the half circle 22 on the side of the fixed end thereof decreases, while the radius $r2$ of the half circle 24 on the side of the free end increases. On the other hand, when a force is applied in the direction opposite to that applied in the above case, then the radius $r1$ of the half circle on the side of the fixed end increases, while the radius $r2$ of the half circle $r2$ decreases, thus presenting a symmetrical pattern. In passing, shown at 26' is a portion corresponding to the third and fourth linear portions of FIG. 1. The same description may be applied to FIG. 8. Shown at 21' is a portion corresponding to the first linear portion. In general, a plate-spring having a cross-sectional construction, in which at least a pair of opposing curved portions are formed, presents characteristics as shown in FIGS. 5 and 6, by determining the radius of the curved portion and the radius of curvature to suitable values, so that such a plate-spring may be used in an acceleration detector, fulfilling the aforesaid requirements for the operational characteristics of the device as to the horizontal declination $\theta$.

Since the widthwise direction of the plate-spring is in parallel with the vertical direction, the acceleration detector according to the present invention is hardly susceptible to the vertical vibration, thus preventing mal-functioning and presenting high reliability.

As a result, the dimension of the device in the vertical direction may be minimized and hence the plate-spring is readily attached to the device. In addition, the device may maintain constant its operational characteristics for the horizontal declinations of the accelerations of a relative wide range.

Meanwhile, in the example shown in FIG. 1, there is a possibility of the operational characteristics varying for some reason at a horizontal declination $\theta = 0°$, in case the center of the inertial body 3 is deviated from the longitudinal axis of the bar magnet 4. As a countermeasure against this, it is recommendable that, as shown in FIG. 9, a slightly recessed portion 9 be provided in a minute gap between the bar magnet 4 and the inertia body 3 on the base mount 1, so that the inertial body may be positioned on the aforesaid longitudinal axis. As a result, the inertial body 3 is attracted to the bar magnet 4 and thus seated in the recessed portion 9, thus preventing misalingment. In this case, it is further recommendable that the shape of the inertial body 3' be of a spherical shape as shown.

In addition, for preventing the transverse displacement of the inertial body 3 and the resulting permanent deformation due to a large external force, there may be advantageously provided a projection 11 as shown in FIG. 10. On the other hand, it is further advantageous to provide a fixed contact 5' which is of a multiple-finger form of a 'L' shape, as shown in FIGS. 10 and 11, because the time of the fixed contact contacting the inertial body may be maintained constant, irrespective of the acting direction of the acceleration.

What is claimed is:

1. An acceleration detector, wherein a magnet and a fixed contact member are mounted on a base mount, and an inertial body serving as a movable contact and located between said magnet and said fixed contact is secured to the free end of a plate-spring, while the other end of said plate-spring is secured to said base mount, whereby when an acceleration of a predetermined magnitude is applied to said inertial body, said inertial body is biased against an attracting force of said magnet to contact said fixed contact member, thereby closing an electric circuit, characterized in that the widthwise direction of said plate-spring is perpendicular to the line extending between the center of said magnet and the center of said fixed contact, and that said plate-spring includes at least a pair of opposing curved portions formed between the fixed end and free end thereof, wherein said pair of curved portions are disposed in facing relationship to one another with the respective centers of curvature of said pair of facing curved portions being located in facing relationship to the same surface of said plate-spring.

2. An acceleration detector as set forth in claim 1, wherein said free end of said plate-spring is disposed along a second line extending perpendicular to the first line between said magnet and said fixed contact, said second line being disposed in the vicinity of and parallel to a third line extending along a center line between tangential lines to said respective pair of curved portions perpendicular to said first line.

3. An acceleration detector as set forth in claim 2, wherein said pair of curved portions of said plate-spring have the respective center of curvature of each of said curved portions disposed in the direction of said third line.

4. An acceleration detector as set forth in claim 3, wherein said plate-spring is a configured strip secured in cantilever fashion to said base mount.

5. An acceleration detector as set forth in claim 2, wherein said second line coincides with said third line.

6. An acceleration detector as set forth in claim 5, wherein said plate-spring is a configured strip secured in cantilever fashion to said base mount.

7. An acceleration detector as set forth in claim 1, wherein said plate-spring is a configured strip secured in cantilever fashion to said base mount.

8. An acceleration detector wherein a magnet and a fixed contact member are mounted on a base mount, and an inertial body serving as a movable contact and located between said magnet and said fixed contact is secured to the free end of a plate-spring, while the other end of said plate-spring is secured to said base mount, whereby when an acceleration of a predetermined magnitude is applied to said inertial body, said inertial body is biased against an attracting force of said magnet to contact said fixed contact member, thereby closing an electric circuit, characterized in that the widthwise direction of said plate-spring is perpendicular to a first line extending between the center of said magnet and the center of said fixed contact, and that said plate-spring consists of:
   a first linear portion extending from the fixed end of said plate-spring at a right angle to the fixed end surface of said base mount;
   a first curved portion continuous with the end of said first linear portion and inscribing a quarter circle;
   a second linear portion continuous with the end of said first curved portion and extending in a tangential direction thereof;
   a second curved portion continuous with the end of said second linear portion and inscribing a half circle which faces said first curved portion;
   a third linear portion continuous with the end of said second curved portion and extending in parallel with said second linear portion; and
   a fourth linear portion continuous with the end of said third linear portion in a direction at a right angle to said second linear portion but in parallel with said first linear portion;
   while the lengths of said first and second linear portions and the radii of curvatures of said first and second curved portions have the substantially same values which approximate each other, the length of said third linear portion being slightly smaller than said values and the length of said fourth linear portion being slightly greater than said values.

9. An acceleration detector as set forth in claim 8, wherein said plate-spring further includes at its fixed end an extension along the fixed end surface of said base mount, said extension being secured to said base mount through the medium of a holding member that has a length corresponding to the extension.

10. An acceleration detector as set forth in claim 8, wherein said fourth linear portion of said plate-spring is disposed along a second line perpendicular to said first line, said second line being disposed in the vicinity of a third line extending along a center line between said first linear portion of said plate-spring and a tangential line to said second curved portion extending perpendicular to said first line.

11. An acceleration detector as set forth in claim 10, wherein said second line coincides with said third line.

12. An acceleration detector as set forth in claim 10, wherein said plate-spring is a configured strip secured in cantilever fashion to said base mount.

13. An acceleration detector as set forth in claim 8, wherein the sum of said value of the length of said third linear portion and said value of said second radius of curvature is approximately equal to one-half the sum of the value of the length of said second linear portion, the value of said first radius of curvature and the value of said second radius of curvature such that said fourth linear portion is disposed along a second line extending approximately centrally between said first linear portion and a tangential line to said second curved portion perpendicular to said first line.

14. An acceleration detector as set forth in claim 13, wherein said plate-spring is a configured strip secured in cantilever fashion to said base mount.

15. An acceleration detector as set forth in claim 8, wherein said plate-spring is a configured strip secured in cantilever fashion to said base mount.

* * * * *